2,944,291
Patented July 12, 1960

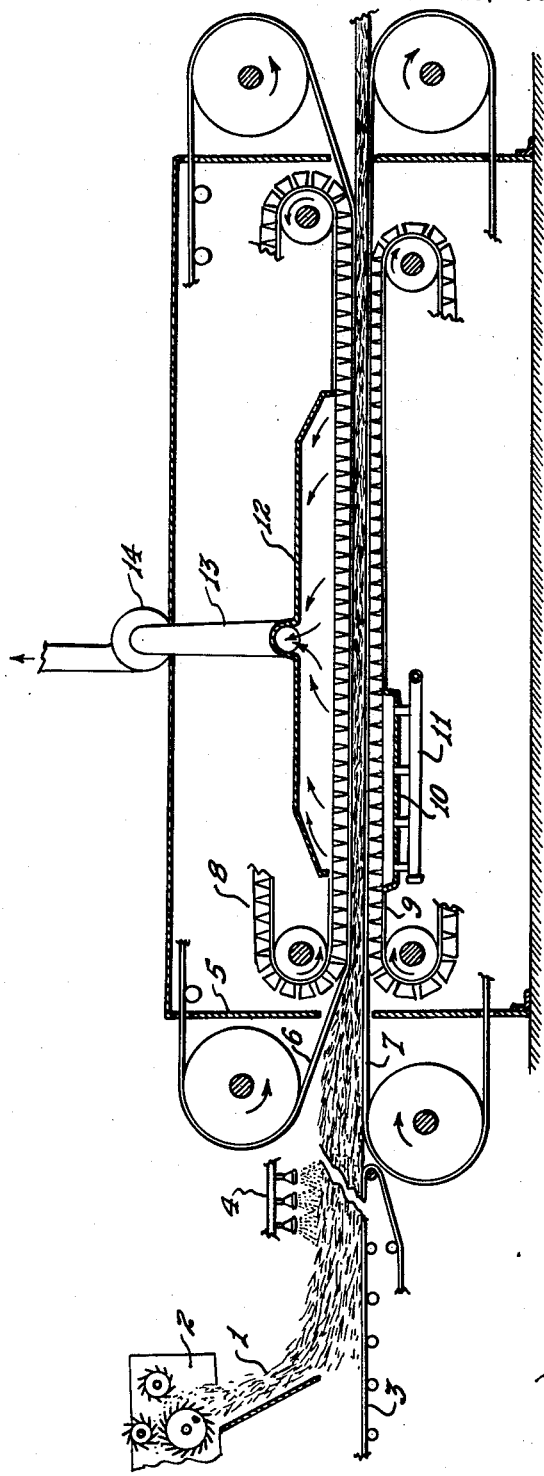
INVENTORS.
WILLIAM L. PRIOR
AND HOWARD J. SNELSON,
BY
ATTORNEYS.

2,944,291

PROCESS FOR STEAM TREATING MAGNESIUM CEMENT FIBROUS PANELS

William L. Prior and Howard J. Snelson, Newark, Ohio, assignors to Tectum Corporation, Columbus, Ohio, a corporation of Ohio Filed Oct. 28, 1957, Ser. No. 692,922

13 Claims. (Cl. 18—47.5)

This invention relates to the formation of structural building material in the form of fibrous board composed of wood wool or excelsior and a magnesium cement binder. More particularly, the instant invention relates to procedures whereby the setting time of the magnesium cement can be greatly reduced and, at the same time, certain physical characteristics of the product improved over similar products made by presently known methods.

The instant invention is particularly adapted for use in a continuous process wherein the raw materials are assembled, compounded, compressed and the cementitious binder set or cured in a continuous operation. The continuous processing of such material has hitherto presented numerous problems, particularly insofar as the formulation and handling of the magnesium cement is concerned; and while magnesium cement panels are currently being manufactured in this country in accordance with the teachings of Collins Patent No. 2,655,458, the procedures involved require careful control over the chemical activity of the magnesium oxide and a press or setting time from a maximum of about 10½ minutes to a minimum of about 4 minutes. As opposed to this, in accordance with the instant invention the press or setting time is reduced to a maximum of about 5 minutes and a minimum of about 30 seconds with optimum results in the range of 60–90 seconds. In addition, the chemical activity of the magnesium oxide becomes unimportant and any active oxide may be employed.

The magnesium cements to which this invention relates are generally known as "magnesium oxysulfate cement" and "magnesium oxychloride cement." The former is preferred and is of the system $MgO—MgSO_4—H_2O$, although it will be understood that magnesium oxychloride cement may be readily substituted without departing from the spirit of our invention. Actually, the designation "magnesium oxysulfate cement" appears to be a misnomer in that the system is correctly identified as sulphated magnesium hydroxide, made by the reaction of magnesium oxide with a solution of magnesium sulfate (Epsom salts). However, since the designation "magnesium oxychloride" is in general usage both in the texts and in the patent art, such designation will be employed herein.

Similarly, while the magnesium oxide cements have been known and used for many years, technical data concerning their precise composition has been not only meager but vague and conflicting, and over the years certain misconceptions concerning the nature and character of these cements have arisen and have been accepted and followed by those working in the art. Paramount among these is the belief that these cements are of non-hydraulic character in that they will not set under water. This concept has been firmly entrenched in the industry and the workers in the art have uniformly avoided procedures and practices which would increase the moisture content of the cement above that necessary to initiate the exothermic reaction of the magnesium oxide. Consequently, magnesium cement panels have hitherto been manufactured by dry heat processes in which the setting or curing of the cement occurs in a controlled atmosphere which prevents the absorption of moisture by the cement as the exothermic reaction takes place. In accordance with the teachings of the aforementioned Collins patent, for example, it was taught that the setting time of the magnesium cement could be reduced to practical limits for continuous processing by preheating the binder impregnated mat prior to compression in an atmosphere so controlled that it neither wet nor dried the mat to any substantial extent. While this procedure has been commercially practiced with good results, and has materially reduced the time required to cause the cement to set, it nevertheless requires careful selection of the active oxide and the setting time is still such that it requires a press section having a length in excess of 100 feet even at relatively slow operating speeds.

The present invention is based upon our discovery that the magnesium oxide cements can be caused to set under conditions of extreme moisture content and that such cements are, in fact, hydraulic in character. Coupled with this, we have discovered that the setting time for such cements can be accelerated by the saturation of the fiber-binder mixture with live steam to the point where the exothermic reaction takes place and the binder sets within a matter of as little as 30 seconds. While we do not wish to be limited by theory, it is our belief that the actual setting of the magnesium oxide takes place substantially instantaneously at the time the temperature of the binder reaches 212° F. Consequently, in accordance with our invention, we endeavor to heat the binder as rapidly as possible so as to cause the exothermic reaction of the binder to take place as rapidly as possible. Once the binder reaction has begun, it will carry through to completion on its own accord, but by rapidly bringing the temperature of the binder to 212° F., the natural reaction is accelerated and is, in fact, driven to completion at the time the temperature of the material reaches 212° F.

Steam has not hitherto been employed as a setting medium for magnesium cement. This has been due in part to the accepted theory that the addition of moisture to the cement was deleterious to the chemical reaction which takes place and in part to the fear that the passage of live steam through a fiber-binder composition would cause undesirable erosion of the binder. Our studies have shown, however, that steam can be successfully used to accelerate the exothermic reaction of the magnesium oxide provided certain critical ranges of operating conditions are observed. For example, we have found that the "quality" of the steam employed to saturate the mat is a key factor in the successful practice of our process and, as will be explained more fully hereinafter, "low quality" steam must be employed. Our tests show that super-heated steam will not work satisfactorily. Similarly, we have found that the line pressure of the steam as it passes through the mat and the duration of the steaming cycle are factors which have a direct bearing on the physical properties of the finished product and hence must be properly controlled.

In the light of the foregoing, it is a principal object of our invention to provide a process for the rapid continuous manufacture of panels having a cementitious binder.

A further object of our invention is the provision of a process wherein live steam is utilized to accelerate and carry to completion the exothermic reaction of a cement binder, such as magnesium oxide cement.

Still a further object of our invention is the provision of procedures for the formation of magnesium cement bonded fibrous structures which are particularly adapted for continuous production wherein the material being formed can be compacted to size and caused to set in approximately 1 minute or less.

The foregoing, together with other objects of our invention which will appear hereinafter or will be apparent to the skilled worker in the art upon reading these specifications, we accomplish by those procedures and practices of which we shall now describe certain exemplary embodiments.

Reference is now made to the accompanying drawings wherein:

Figure 1 is a diagrammatic elevational view with parts broken away illustrating exemplary apparatus for steam treating the binder coated fibers in accordance with our invention.

In the practice of our process, we prefer to use a long fiber Aspen excelsior as the fibrous material, although other fiber may be used inclusive of bagasse, straw, synthetics and the like. The binder is preferably composed of magnesium oxide and a gauging solution of water and magnesium sulphate. The fiber-binder composition will preferably have a binder to fiber ratio of 55 parts binder to 45 parts fiber, the parts being by weight, although this ratio may vary from 70–30 to 30–70 depending upon the fibers used; and the magnesium oxide to magnesium sulphate ratio will preferably be 65 parts oxide to 35 parts sulphate, although we have found that this ratio can vary from 40–60 to 80–20, the parts being by weight. Preferably the gauging liquid will consist of a 26% magnesium sulphate solution.

In the preparation of the binder, the gauging solution is prepared by adding the $MgSO_4 \cdot 7H_2O$ crystals to water. The magnesium oxide is then added to the gauging solution and thoroughly mixed. After mixing, the binder is sprayed over the fibers which are then agitated, as by means of picker rolls, to thoroughly coat each fiber with binder. The binder-coated fibers are then ready to be introduced into a steam press and compacted to the desired thickness.

Insofar as the density of the board is concerned, it may be varied as desired throughout a range of about 10 lbs. per cubic ft. to 50 lbs. per cubic ft., although we have found densities in the range of 15 lbs. per cubic ft. to 26 lbs. per cubic ft. produces board which is ideally suited for construction purposes. The amount of material required to make one board ft. of board (12" x 12" x 1") having a density of 21 lbs. per cubic ft. is as follows:

| | |
|---|---|
| Excelsior at 20% moisture | gm. 448 |
| MgO | gm. 284 |
| $MgSO_4 \cdot 7H_2O$ | gm. 153 |
| Water | cc. 435 |

Where 15 lbs. per cubic foot density board is desired, the proportions will be 15/21 of those given above. Where it is desired to produce a board having a thickness of 2 or 3 inches, the material amounts will be doubled or tripled, as the case may be, but the proportions will otherwise remain the same. Similarly, if it is desired to produce a board having a 26 lbs. per cubic foot density, the amounts of material are increased by a ratio of 26/21 for the same volume of board.

Essentially, the press will comprise upper and lower perforated platen between which the fiber-binder mixture is compacted to predetermined thickness, such as 1 inch, 2 inches or the like. The compressing pressure will be adjustable and will vary in accordance with fiber density, cut and type of fiber employed. For board having a 15 lb. per cubic foot density, the press pressure will be approximately 1200 lbs. per square foot, although the pressure range may vary from 800 lbs. per square foot to the aforementioned 1200 lbs. Where 21 lb. density is desired, we have found a press pressure of 2000 lbs. per square foot to be highly satisfactory.

Upon the compacting of the material to the desired thickness, it is then subjected to live steam to effect the setting of the binder, the steam being introduced into the press through the perforations in the lower platen, forced through the mat, and evacuated through the upper platen. Preferably, the press will be heated prior to use so that its parts will be at substantially 212° F., thereby avoiding heat loss as the steam passes through the press. The heating of the press may be conveniently accomplished by enclosing it in a jacket or other insulated enclosure through which hot air may be circulated, thereby preventing the metallic structure from sapping the heat generated by the steam and also preventing excessive condensation which would result were the live steam to be introduced into a relatively cold press.

The steam curing time may run anywhere from 30 seconds to approximately 5 minutes. Of course, the actual steaming operation can be conducted for as long a time as desired, but beyond the necessary length of time to bring the internal temperature of the product to 212° F., the additional steaming time appears to be unnecessary. However, subsequent to the actual time necessary to bring the internal temperature of the board to 212° F., we prefer to add a "soaking" cycle which is in effect a safety factor. Thus 30 to 60 seconds may be added to the actual setting time (the time required for the product to reach 212° F.), thereby assuring a complete and full cure. Thus, curing time can be defined as the time it takes the composition to go from 70° F. (normal room temperature) to 212° F. plus any additional time which may be allowed for soaking, the safety factor. The normal curing cycle will be from 1 minute to 1½ minutes inclusive of the steaming and soaking periods.

One of the keys to the successful practice of our process is the use of "low quality steam." Steam quality is a function of the moisture content of the steam. Generally speaking, any steam which is under 90% quality, i.e., contains more than 10% moisture, is considered low quality steam. Consequently, in accordance with our invention, we prefer to use steam which has a moisture content of 10% or more.

By way of theory as to what happens as the steam passes through the compacted material, the steam carries a sufficient amount of moisture to surround the cement particles, condense upon them with a subsequent release of heat. This released heat stimulates the exothermic reaction of the magnesium oxide which in turn generates additional heat which converts the condensate back into steam which is exhausted through the upper platen. The use of low quality steam conforms to our theory that an excess of moisture should be present to complete the binder reaction. This was confirmed by test in which super-heated steam (steam which has substantially no moisture content) was used in place of low quality steam. It was found that with super-heated steam, poor results were achieved and in many instances the binder was found to remain unbonded. Similar unsatisfactory results were noted in products formed with steam of a quality above 90% although the differences noted varied with the length of the steaming cycle.

There is no practical lower limit to the quality of the steam which may be successfully used. The process may be carried to the ultimate using 0% steam-boiling water. In other words, rather than using live steam as the curing medium, hot water may be used, the water being brought just to its boiling point but short of the stage of a turbulent boiling condition. Test samples in which the material was submerged in boiling or near boiling water were found to set as effectively as where the material was subjected to live steam; and the properties of the water set product were substantially the same as those of the steam set product.

The steam pressure at the time the steam is introduced into the press may vary from 5 lbs. per square inch to 90 lbs. per square inch without producing excessive binder erosion. We prefer to operate within the range of 10 to 15 lbs. per square inch gauge pressure. Within this range optimum results are obtained insofar as the physical properties of the product are concerned.

Referring now to the drawings, we have therein illustrated an exemplary device by means of which our process may be practiced to produce board in a continuous operation. As seen in the drawing, the fibers 1 are delivered from a hopper or chute 2 onto a moving conveyor belt 3 where the fibers are formed into a mat and sprayed with binder from a spray-head 4 arranged transversely with respect to the conveyor belt 3. It will be understood that the apparatus illustrated for depositing the fibers on the conveyor is diagrammatic only and we prefer to process the fibers in accordance with the teachings of Collins United States Patent No. 2,744,045, Apparatus and Process for Continuously Feeding and Spraying Wood Wool and Like Materials, which teaches apparatus and procedures for beating and coating the fibers, including such steps as fluffing the initially compacted and baled fibers, establishing a uniform flow of the fluffed material and depositing it in a uniform manner on a conveying means, coating the fibers with the binder material and depositing the coated fibers on the continuously moving conveyor 3 in the form of a mat which is conducted to the press.

The conveyor delivers the mat to the press 5 where the mat is compacted to form the matted material into a layer of predetermined thickness. The press is composed of upper and lower conveyor belts 6 and 7, respectively, the belts being of foraminous character, preferably formed of stainless steel perforated on ½" centers, and backed up by a series of cast iron flights 8 and 9 which extend crosswise with respect to the length of the press and linked together for continuous movement in synchronism with the movement of the belts 6 and 7. It will be understood that the flights 8 and 9 will be adjustably mounted so that the distance between the upper and lower flights may be varied in accordance with the desired thickness of the compressed product.

A manifold 10 underlies the lower flight 9, the manifold 10 having elongated openings in its upper surface which communicate with openings in the under surfaces of the flights 9. Live steam is fed through pipe 11 into the manifold, the steam passing upwardly from the manifold into the flights 9. The upper surfaces of the flights are in the form of a grating or grill through which the steam will pass upwardly through the perforations in belt 7 and into the compacted material. The upper flights 8 are similar to the lower flight excepting they communicate with an exhaust manifold 12, the arrangement being such that the steam passing through the mat will be evacuated through the upper flights 8 into the exhaust manifold 12. Preferably, the exhaust manifold will be of a length several times that of the steam manifold 10 so that the evacuation of steam and moisture from the mat may continue subsequent to the termination of the actual steam application. The steam will be exhausted from the manifold through exhaust stack 13 having a blower 14.

As the mat moves through the press, the magnesium cement will be set sufficiently to maintain the thickness formed by the press, so that when the mat leaves the press it will not swell or expand, but will remain at the dimension established by the press. Upon passage of the formed mat from the press, the mat will be passed through one or more drying ovens wherein heated air is circulated to remove additional moisture from the mat and cause it to thoroughly dry. The mat may be cut into desired panel size as it emerges from the drying ovens for shipment or storage. The construction and operation of the drying ovens is well known in the art and forms no part of the instant invention.

The foregoing brief description of the press mechanism is exemplary only and is simply intended to set forth the manner in which our process may be adapted to the continuous manufacture of fibrous panels.

Steam curing in accordance with our invention materially shortens the time necessary for setting of the binder. Besides speeding up production, steam curing also has beneficial effects on the finished product, as evidenced by the following comparison of steam cured samples to samples cured by present dry cure methods.

*Comparison of dry cure with steam cure* [1]

|  | Curing Cycle, Min. Sec. | Modulus of Rupture, p.s.i. | Wet Strength Loss, Percent | Linear Swelling, Percent | Density, lb.cu.ft. |
|---|---|---|---|---|---|
| Steam Cure | [2] 1:00 | 488.6 | 67.27 | 4.72 | 21.92 |
| Dry Cure | [3] 5:24 | 487.2 | 74.90 | 5.80 | 20.16 |

[1] Averages of 10 control samples.
[2] 45 sec. steam period, 15 sec. soaking, 52% quality steam at a pressure of 10 p.s.i.g. (lbs. per square inch gauge).
[3] Hot air at 180° F.

Microscopic examination of steam cured and dry cured board shows no material differences between the two forms and the coverage of the fibers is substantially the same. All tests indicate that board formed in accordance with our invention has physical and chemical properties which are either superior or equal to board formed by presently known dry cure methods. Our process has materially reduced production time which has in turn enabled us to materially reduce the size and cost of the equipment required for processing the board. At the same time, the relative chemical activity of the magnesium oxide has been rendered unimportant, thereby permitting the use of a wider range of oxides which are more readily available and less expensive.

Having thus described our invention in certain exemplary embodiments, what we desire to secure and protect by Letters Patent is:

1. The method of forming a low density porous panel composed of fibrous material and a magnesium cement binder composed of water-borne magnesium oxide and magnesium salts of the group of sulphate and chloride, said binder being settable upon hydration by an exothermic reaction, which method consists essentially of forming a porous layer of fibers each of which is thoroughly coated with said cementitious binder, compacting the porous layer so formed between compressing surfaces and, while holding the layer between said compressing surfaces, saturating said porous layer with an aqueous fluid at a temperature of substantially 212° F. so as to rapidly bring said layer to an internal temperature of substantially 212° F. under conditions of excessive moisture, whereby to rapidly accelerate and carry to completion the exothermic reaction of said cement binder to set said layer against expansion while holding it between said compressing surfaces.

2. The method claimed in claim 1 wherein the fiber-binder ratio is substantially 45% fiber to 55% binder on a weight basis.

3. The method claimed in claim 1 wherein the ratio of magnesium oxide to magnesium salts is from 40–60 to 80–20 parts by weight.

4. The method claimed in claim 1 wherein the compacted layer is rapidly heated by means of steam injected in said layer while held between said compressing surfaces.

5. The method claimed in claim 4 wherein said steam is of low quality, having a moisture content of at least 10%.

6. The method claimed in claim 5 wherein said layer is subjected to low quality steam for at least 30 seconds and not more than substantially 5 minutes.

7. The method claimed in claim 6 wherein, subsequent to the passage of said low quality steam through said layer, said layer is retained between said compressing surfaces for a soaking period, followed by its removal from between said compressing surfaces.

8. The method claimed in claim 7 wherein said layer has a density of substantially 15 lbs. per cubic foot, and wherein said layer is compacted under a pressure of from 800 to 1200 lbs. per square foot.

9. A method for producing a panel composed of magnesium cement and wood fibres, which comprises forming a layer of fibers impregnated with water-borne magnesium oxide and magnesium salts of the group of the sulphate and chloride, compressing the layer so formed between compressing surfaces at least one of which is of a foraminous character and, while the layer is so compressed, subjecting it to live steam having a moisture content of at least 10% and a line pressure of not more than 90 lbs. per square inch gauge.

10. The method claimed in claim 9 wherein said layer is subjected to said live steam for a period of from about 30 seconds to about 5 minutes.

11. A method for rapidly and continuously forming cement bonded fibrous panels wherein a layer of fibers impregnated with a mixture of water-borne magnesium oxide and magnesium salts of the group of sulphate and chloride is continuously moved between compressing surfaces, the step which comprises causing said layer to set while held between said compressing surfaces by subjecting these layers to wet live steam for at least 30 seconds at a line pressure of at least 5 lbs. per square inch gauge and not more than 90 lbs. per square inch gauge.

12. A method of rapidly forming a cement bonded fibrous panel wherein a layer of fibers thoroughly coated with a mixture consisting essentially of water-borne magnesium oxide and magnesium salt of the group of sulphate and chloride is compacted under pressure to predetermined thickness, the step which consists in passing wet live steam through the compacted layer for a period of time sufficient to bring the internal temperature of said layer to 212° F., whereby to force the exothermic reaction of said magnesium oxide-magnesium salt mixture to completion and cause said layer to set in its compacted condition.

13. The method claimed in claim 12 wherein said steam is of not more than 90% quality and is introduced into said layer at a line pressure of not more than 90 lbs. per square inch gauge.

References Cited in the file of this patent
UNITED STATES PATENTS

| | | |
|---|---|---|
| 1,990,554 | Libberton | Feb. 12, 1935 |
| 2,310,128 | Smith | Feb. 2, 1943 |
| 2,543,752 | Austin et al. | Mar. 6, 1951 |
| 2,635,301 | Schubert et al. | Apr. 21, 1953 |
| 2,655,458 | Collins | Oct. 13, 1953 |
| 2,698,260 | Meauze et al. | Dec. 28, 1954 |
| 2,703,762 | Slayter | Mar. 8, 1955 |